Jan. 31, 1956   E. C. KOSTER   2,732,632
APPARATUS FOR USE IN DETERMINING MOISTURE CONTENT
Filed Sept. 8, 1951   2 Sheets-Sheet 1

INVENTOR.
Edward C. Koster
BY
Hyde, Meyer, Baldwin, & Doran
ATTORNEYS

Jan. 31, 1956  E. C. KOSTER  2,732,632
APPARATUS FOR USE IN DETERMINING MOISTURE CONTENT
Filed Sept. 8, 1951  2 Sheets-Sheet 2
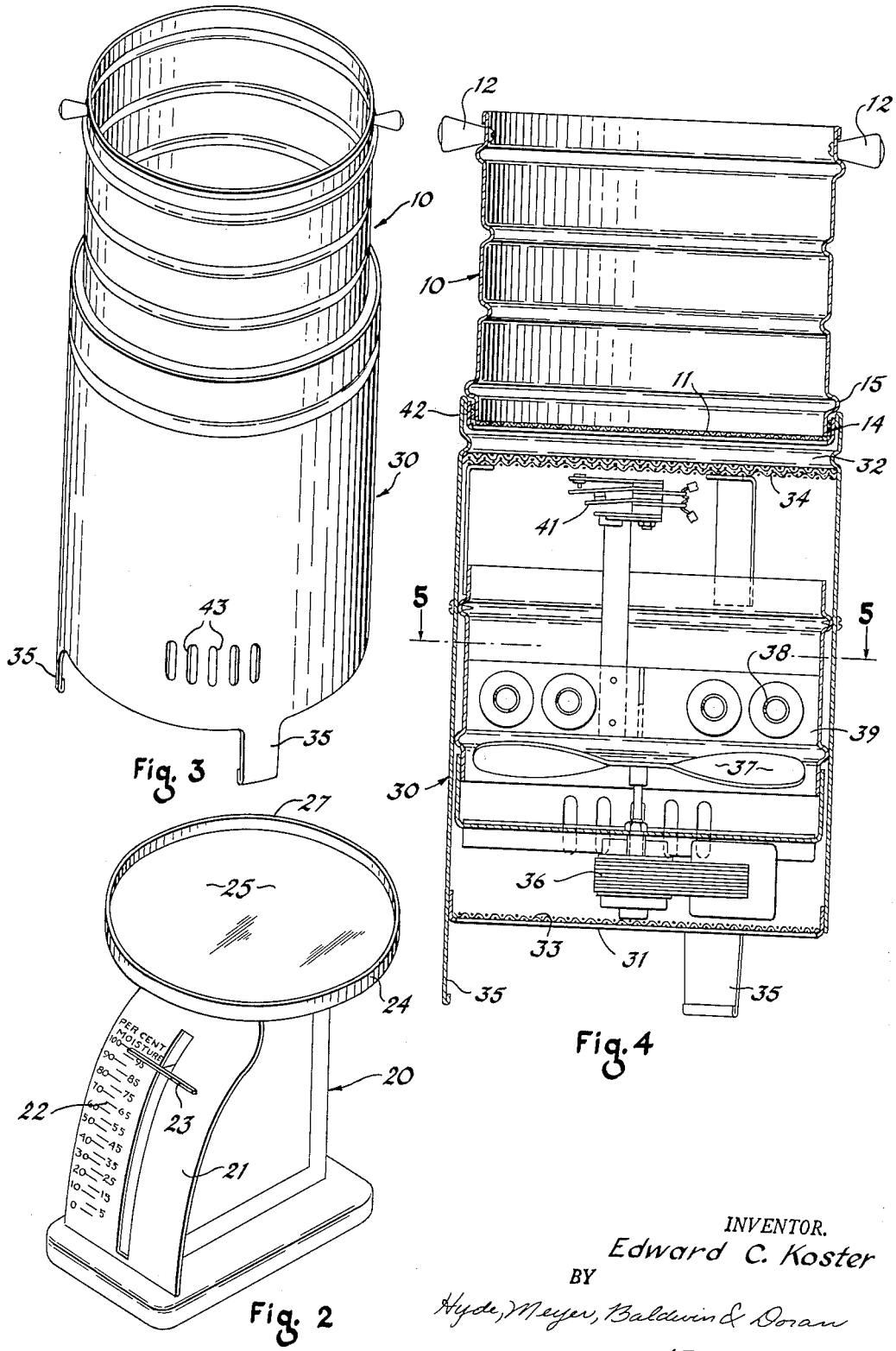
INVENTOR.
Edward C. Koster
BY
Hyde, Meyer, Baldwin & Doran
ATTORNEYS United States Patent Office 2,732,632
Patented Jan. 31, 1956

2,732,632
APPARATUS FOR USE IN DETERMINING MOISTURE CONTENT

Edward C. Koster, Shaker Heights, Ohio, assignor to The Vlchek Tool Company, Cleveland, Ohio, a corporation of Ohio Application September 8, 1951, Serial No. 245,739

1 Claim. (Cl. 34—233)

This invention relates to an inexpensive apparatus for aiding in the rapid determination of the moisture content of grain, various types of hay, and straw by the farmer or layman.

This application is a continuation-in-part of my co-pending application on a Drier, Serial No. 76,064, filed February 12, 1949, and now abandoned.

Every progressive farmer would like to quickly determine the moisture content of his crops at harvest time. A quick and accurate determination of moisture content enables him to harvest each crop at the optimum time.

If the crops are to be stored, harvesting at the proper moisture content preserves in the crop its maximum food value for the winter feeding of the farm animals. Crops stored in silos and graineries cannot be stored if the moisture content is out of range since spoilage will occur. Spontaneous combustion within the stored mass due to improper moisture content may also wipe out the farmer's investment not only in the crop but in his buildings and equipment. Fire is an ever present danger on every farm located far from the city fire departments and water supply.

If the crops are to be sold, harvesting at the optimum time will assure the farmer of a higher income. The price offered at the grain elevator for grain, such as wheat, oats, barley, corn, etc., depends on its moisture content. If the moisture content is too high, the sale price is lower.

While the elevator operator may have available expensive equipment, costing up to $200.00 or more, for determining moisture content, the farmer cannot well afford the loss of a half day or so, in busy harvest time, to take a grain or crop sample to the elevator for testing before storing his crop. The farmer is also reluctant to accept without question the elevator operator's determination of the moisture content of the grain he hauls to market.

The apparatus of this invention is inexpensive and helps provide a rapid, accurate moisture content determination. The farmer does not need to spend long hours in oven-drying his crop, to spend long hours making complex computations, and to invest lots of money in equipment. He may make the moisture content determination quickly, accurately and inexpensively on his own farm at harvest time of the crop dried by this apparatus. He can always quickly select the appropriate time to harvest, store, or sell his grain.

Another object is to provide a simple improved apparatus for the purpose, useable readily for any ordinary farm crop, either bulky or compact, and which is efficient, durable and not likely to get out of order in normal service.

Further objects of the invention in part are obvious and in part will appear more in detail hereinafter.

In the drawings, which represent one suitable embodiment of the invention,

Fig. 2 is a perspective view of the special scale shown in Fig. 1;

Fig. 3 is a view of the heater unit and specimen container elements of the moisture tester unit;

Fig. 4 is a vertical section of Fig. 3; and

The moisture tester unit consists of three elements, the sample specimen container 10, a special scale 20 for determining moisture percentage, and a heater unit 30 for drying the sample of the crop to be tested.

Figure 5:
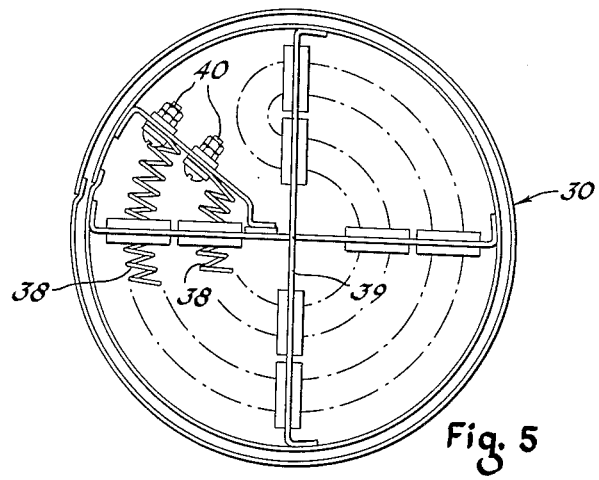
Fig. 5 is a horizontal section taken along the line 5—5 of Fig. 4.
Figure 1:
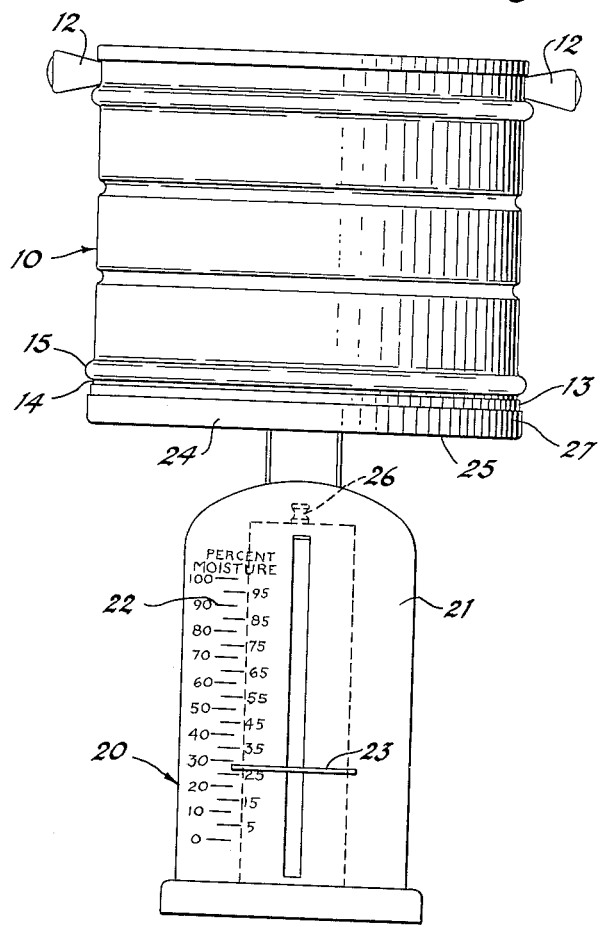
Fig. 1 is an elevational view of the special scale and specimen container elements of the moisture tester unit.

The sample specimen container 10 has a cylindrical body with a screen 11 stretching across the bottom thereof. The sample rests upon the screen which permits a thin distribution of the crop with an exposure of the maximum surface of the crop to a uniform flow of dry heated air from the heating element of the heater unit, to be later described, which is so spaced that the crop sample will not be scorched so as to then give an erroneous reading of moisture content. Screen 11 also aids in uniformly distributing the dry heated air. Handles 12 are provided at the top of the specimen container so that the container may readily be handled even though it may be hot to the touch after setting on the heater unit, as shown in Figs. 3 and 4. An aligning means 13 on the bottom of the sample specimen container removably aligns the container with either the platform of the scale, as shown in Fig. 1, or the top of the heater unit, as shown in Fig. 4. This aligning means consists of a cylindrical lower flange 14 and a circular bead 15 on the container 10 immediately above the flange 14.

The special moisture tester scale 20, as shown in Fig. 2, is especially designed as an element of this moisture tester unit. The scale has a special scale face 21 having graduations 22 from "0" to "100" in per cent moisture content. These graduations are arranged in "reverse order" with respect to the graduations on the normal scale face. In this special scale, the graduations increase numerically from bottom to top of the special scale face with pointer 23 moving downwardly as the weight on the scale increases. In the normal scale, the graduations increase numerically from top to bottom if the pointer moves downwardly as the weight on the scale increases. Hence, graduations 22 are arranged in "reverse order." Knob 26, as found on the conventional scale, is used to adjust pointer 23 with respect to any reference line of graduation 22. This knob has a special use in the moisture tester unit which will be described later in the specification.

The right hand side of special scale face 21 may also contain indicia disclosing the ranges of ideal moisture contents for storage or sale of each of the different grains or crops to be tested.

Aligning means 24 of the special scale is adapted to coact with the aligning means 13 of the specimen container 10 to hold the container centrally on the special scale. The aligning means 24 consists of a tray or platform 25 having an upturned circular rim 27 conforming to the periphery of the lower flange 14 of the container. These conforming surfaces are disclosed as cylindrical in the drawings, but it is readily understood that they may be of any conforming shape.

The forced flow heater unit 30 provides the drying air maintained at a fixed temperature to evaporate the moisture in the sample. The heater unit consists of a cylindrical housing having an inlet 31 and outlet 32, each provided with screens, shown at 33 and 34 to insure an equal distribution of dry heated air and to prevent the entrance of foreign matter to the heater unit. Feet 35 support the heater unit and provide an inlet for the air. Although it is contemplated to cover within the scope of this invention other types of heater units, an electrical unit is disclosed. An electrical motor 36 drives a fan 37 to give a forced air flow over heating elements or heating coil 38. The heating coil is rigidly located within the cylindrical housing by cross members 39 so that the coil will not move out of place during the usual rough handling encountered by a farm implement. The coil is connected to terminals 40 so that it may be connected to the power line separate from the motor or either in series or in parallel with motor 36.

Thermostat 41 is designed to maintain uniform air temperature and to prevent scorching of the specimen in container 10. It is supported beyond or downstream from heating coil 38 within the cylindrical housing heater unit by a rigid bracket to keep it permanently located immediately below the outlet 32 and fairly close to the sample supported by the screen 11. This thermostat controls the heating coil 38 and/or the motor 36 so that only drying air within the desired temperature range is supplied to the sample through the distribution screens 34 and 11. This prevents scorching of the sample as well as over or under drying of the sample, each of which would give an undesirable moisture content reading. A timer (not illustrated) may be inserted in the electrical circuit to cut off the flow of drying air at the end of a designated period, if desired.

Aligning means 42 on top of the heater unit is adapted to co-act with the flange 14 and bead 15 of the sample container to nest the sample container snugly in place over the vertically flowing drying air from the heater unit. The sides of the housing have louvred type slots 43 to relieve back pressure on the fan and motor after as much hot air is forced through the sample as the resistance of the screens and sample material will permit. The balance is circulated underneath the sample and out of the sides of housing through the louvre-type slots without disturbing the flow of the air through the inlet 31 to the fan.

The procedure for making a moisture test will now be described. The sample specimen container 10 is placed on the platform 25 of the special scale 20. The container 10 has a tare weight of 150 grams, especially designed for use on the special scale. The pointer 23 is adjusted to align with the "100" graduation of the per cent moisture scale by adjusting knob 26. Of course, it is understood that the special scale face 21 may be adjusted relative to the pointer 23, in a modified structure, to provide the same relative adjustment without the use of knob 26. Then, the container is filled with sample until the scale pointer 23 registers "0." An effort should be made to distribute the sample uniformly over screen 11 to assure uniform and thorough drying. The container is lifted off the scale platform and placed on heater unit 30, as seen in Fig. 4. The heating coil 38 and motor 36 are energized to supply the drying air. Thirty-five minutes are usually allowed for drying the sample before it is removed from the heater and again placed on the special scale. The moisture content of the sample specimen is read directly on the special scale face and may be compared with the ideal moisture content of the particular crop, if this information appears on the right-hand side of special scale face 21.

In the event that the farmer or whoever is making the test has gone about some other task and forgotten to return to check the moisture content after the predetermined thirty-five minutes of time has elapsed, no harm can come to the sample. He can still take his accurate percentage reading after an extended period of elapsed time and with the use of a timer even after one or two hours of time has elapsed. This is true only because of the fact that all three parts of this moisture tester unit are all held in a definite relation to each other to provide controlled heating.

The three elements of the moisture tester unit—the sample container 10, the heater unit 30 and the special scale 20—are designed to be sold as a unitary, composite package for the farmer to use as a unit so that he may quickly, inexpensively and accurately determine the moisture content of his crops. The heater unit 30 with motor, fan, coil and thermostatic control constitute a heater which is an integral part of this tester unit and must be made in the relationship of component parts proposed with fan, coil, thermostat, louvre-type vent slot fixed in the relation they are fixed to ensure the proper moisture extraction by the forced passage of uniformly distributed, dry heated air at a predetermined temperature at a fixed distance through a whole grain, hay, straw, or other crop sample in a given length of time. The cylindrical sample container 10, in order to properly expose the sample to the flow of heated air from the heater unit, must of necessity be an integral, although removable, part of this tester unit and made proportionately as here made and weighing proportionately as here specified so as to have a definite tare weight and to properly function with special scale 20 to determine the per cent of moisture content in the sample. The special scale 20 is not a weighing scale and cannot be used for any other purpose nor with any other equipment. Nor can the sample specimen heater and container be used with any other ordinary scale unless weights are recorded and percentages computed by a long, complicated procedure. The aligning means 13, 24 and 42 assure a relatively air tight connection between container 10 and the heater unit 30 and also assure that the units will not be accidentally knocked out of alignment with each other or disassembled unless the farmer so desires in effecting one of the steps of the moisture testing process. Therefore, each of the three units are an integral, although separable part of the complete moisture tester unit.

It is now quite clear that any progressive farmer may, with the aid of the drier apparatus of this invention, quickly, accurately, and inexpensively determine the moisture content of his crops at harvest time so as to store, harvest or sell them to his best advantage. He need not spend long hours oven-drying his crop sample, to spend long hours making complex computations and to invest lots of money in equipment.

I claim:

In a moisture tester unit, a drying air heater unit of cylindrical tubular form for causing upward axial drying air flow, a heating element and fan located in said unit with each extending substantially across the tubular bore, circumferentially spaced legs protruding downwardly as extensions from the peripheral surface and bottom of the cylindrical form to provide the intake of said unit therebetween while the cylindrical top forms the outlet thereof and forms a cylindrical aligning seat and flange, a removable sample container of substantially the same tubular cylindrical form having a cylindrical lower flange removably fitting down within said cylindrical aligning flange and on said seat of said unit, and a screen across the bottom of said sample container across the full width of the tubular bore for supporting the sample therein and permitting the upward axial flow of drying air through said sample and axially through the cylindrical forms of both said unit and container.

References Cited in the file of this patent

UNITED STATES PATENTS

| 56,861 | Plant | July 31, 1866 |
| 190,824 | Chinnock | May 15, 1877 |
| 1,532,718 | Shover | Apr. 7, 1925 |
| 2,047,765 | Brabender | July 14, 1936 |
| 2,080,168 | Dietert | May 11, 1937 |
| 2,569,749 | Dietert et al. | Oct. 2, 1951 |
| 2,622,438 | Campbell | Dec. 23, 1952 |
| 2,633,018 | McIlvaine | Mar. 31, 1953 |

FOREIGN PATENTS

| 11,452 | Great Britain | 1889 |